(12) United States Patent
Michaud et al.

(10) Patent No.: US 7,788,599 B2
(45) Date of Patent: Aug. 31, 2010

(54) USER INTERFACE ELEMENTS FOR HIERARCHICAL SELECTION OF ITEMS

(75) Inventors: Jeffrey H. Michaud, Foster City, CA (US); Michael Paul Thole, San Jose, CA (US); Mark Joseph Williams, San Francisco, CA (US); Jason Allen Townsend, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 11/494,879

(22) Filed: Jul. 28, 2006

(65) Prior Publication Data

US 2008/0028337 A1    Jan. 31, 2008

(51) Int. Cl.
G06F 3/048    (2006.01)
(52) U.S. Cl. ..................................... 715/810; 715/853
(58) Field of Classification Search .................. 715/810, 715/853
See application file for complete search history.

(56) References Cited

U.S. PATENT DOCUMENTS

| | | | | |
|---|---|---|---|---|
| 5,644,736 A * | 7/1997 | Healy et al. | ........... | 715/784 |
| 5,923,328 A * | 7/1999 | Griesmer | ........... | 715/854 |
| 6,670,973 B1 * | 12/2003 | Hill et al. | ........... | 715/853 |
| 6,765,597 B2 * | 7/2004 | Barksdale et al. | ........... | 715/853 |
| 6,990,638 B2 * | 1/2006 | Barksdale et al. | ........... | 715/853 |
| 7,340,451 B2 | 3/2008 | Sacco | | |
| 7,370,281 B2 * | 5/2008 | Weber | ........... | 715/769 |
| 7,392,488 B2 * | 6/2008 | Card et al. | ........... | 715/853 |
| 7,395,456 B2 * | 7/2008 | Klementiev et al. | ........... | 714/38 |
| 7,395,511 B1 * | 7/2008 | Robertson et al. | ........... | 715/810 |
| 7,512,904 B2 * | 3/2009 | Matthews et al. | ........... | 715/854 |
| 7,587,411 B2 * | 9/2009 | De Vorchik et al. | ........... | 707/102 |
| 2002/0097278 A1 * | 7/2002 | Mandler et al. | ........... | 345/854 |
| 2002/0196293 A1 * | 12/2002 | Suppan et al. | ........... | 345/853 |
| 2003/0197743 A1 * | 10/2003 | Hill et al. | ........... | 345/853 |
| 2006/0218122 A1 * | 9/2006 | Poston et al. | ........... | 707/1 |
| 2006/0218499 A1 * | 9/2006 | Matthews et al. | ........... | 715/765 |
| 2008/0028337 A1 * | 1/2008 | Michaud et al. | ........... | 715/810 |
| 2008/0040690 A1 * | 2/2008 | Sakai | ........... | 715/853 |
| 2008/0046104 A1 * | 2/2008 | Van Camp et al. | ........... | 700/90 |
| 2008/0059911 A1 * | 3/2008 | Kulo et al. | ........... | 715/853 |
| 2008/0059912 A1 * | 3/2008 | Scherpa et al. | ........... | 715/853 |
| 2008/0109761 A1 * | 5/2008 | Stambaugh | ........... | 715/853 |
| 2008/0141176 A1 * | 6/2008 | Fukuoka | ........... | 715/853 |

OTHER PUBLICATIONS

McFedries, Paul; "The Complete Idiot's Guide to Windows XP", Table of Contents, Oct. 3, 2001; Alpha Books,Chapter 3. Making Your Program Do What You Want Them to Do, pp. 1-7.*

* cited by examiner

*Primary Examiner*—William L Bashore
*Assistant Examiner*—David Phantana-angkool
(74) *Attorney, Agent, or Firm*—Fish & Richardson P.C.

(57) ABSTRACT

A user interface element for selecting items from a hierarchy of items can present a cell for each level in the hierarchy of items. Each cell can be associated with a level in the hierarchy and is operable to receive user input. In response to receiving user input directed to a cell, a collection of items can be presented where each presented item is from the level in the hierarchy associated with the cell. Each presented item can also be a child of a selected item in a cell associated with a higher level in the hierarchy.

48 Claims, 6 Drawing Sheets

USER INTERFACE ELEMENTS FOR HIERARCHICAL SELECTION OF ITEMS

TECHNICAL FIELD

This disclosure relates to user interface elements.

BACKGROUND

Some conventional user interface elements allow users to select an item from among several listed items. Such user interface elements can include a list box, combo box and/or drop down menu. Other user interface elements allow users to select an item from an ordered hierarchy of items.

A tree view user interface element contains an item at a first level of the hierarchy that is expandable to display the items at a second level of the hierarchy, where the displayed items are children of the first item. Items in the second level, and subsequent levels, of the hierarchy may be expandable as well. The tree view user interface element can require significant vertical screen space to concurrently display multiple items at each level of the hierarchy.

An expandable menu (e.g., a popup menu or a drop down menu from a menu bar) can also allow selection of items in a hierarchy of items. On selecting a first level item from a menu of items (e.g., by positing an on-screen cursor), a second sub-menu appears (e.g., a cascading menu or fly-out) with child items of the next level of the hierarchy. Expandable menus require both significant vertical and horizontal screen space as each sub-menu level cascades from the previous selection.

SUMMARY

A user interface element for selecting items from a hierarchy of items can present a cell for each level in the hierarchy of items. Each cell can be associated with a level in the hierarchy and is operable to receive user input. In response to receiving user input directed to a cell, a collection of items can be presented where each presented item is from the level in the hierarchy associated with the cell. Each presented item can also be a child of a selected item in a cell associated with a higher level in the hierarchy.

In some implementations, a method includes representing a hierarchy of items in a user interface element that has cells and each cell is associated with a level in the hierarchy and is operable to receive user input.

These and other embodiments can include one or more of the following features. Each cell can display a selected item, where the selected item is one of the items from the hierarchy of items. The method can include presenting an expanded visual representation of the user interface element, in response to user input directed to the user interface element. The method can include presenting a first collection of items in response to user input directed to a cell, where each item in the first collection of items is one of the items from a first level of the hierarchy, the first level associated with the cell. The method can include presenting a second collection of items in response to user input selecting an item from the first collection of items, where each item in the second collection of items is one of the items in a next level of the hierarchy, the next level being a level lower than the first level. The items in the second collection of items can be children of the selected item.

In some implementations, a method includes: presenting a first visual representation of a user interface element operable to select items from among a hierarchy of items; presenting an expanded visual representation providing a first collection of items in response to receiving user input; and presenting a second collection of items in response to receiving user input selecting a first item from the first collection of items.

These and other embodiments can include one or more of the following features. Presenting the first visual representation can include providing an indication of the currently selected items at each level of the hierarchy of items. The height of the first visual representation can be greater than the height of the visual representation of a single item, but less than the height of the visual representation of two items. Presenting the second collection of items can include identifying items for presentation in the second collection of items based on the selected first item. The method can include identifying items for presentation in the second collection of items, where each identified item is a child of the first selected item in the hierarchy of items. The first visual representation can include a plurality of cells, where each cell is associated with a level of the hierarchy of items. Each cell can be a combo box. The expanded visual representation can display more than one item in at least one of the collections of items. The expanded visual representation can be a browser user interface element. The method can include presenting a second collection of items in response to receiving user input selecting a plurality of items from the first collection of items; and receiving user input selecting a second item from the second collection of items. Presenting the second collection of items can include identifying items for presentation in the second collection of items based on the selected plurality of items, where each identified item is a child of the selected plurality of items.

In some implementations, a method includes: providing a user interface element for presentation on a display device; receiving input specifying display of an item in the user interface, where the item is included in a hierarchy of items; and, responsive to the input, displaying a non-hierarchical visual representation of the item.

Other implementations are disclosed which are directed to methods, systems, apparatuses, computer-readable mediums and user interfaces.

The details of one or more embodiments of the invention are set forth in the accompanying drawings and the description below. Other features, aspects, and advantages of the invention will be apparent from the description and drawings, and from the claims.

DETAILED DESCRIPTION

Figure 1:
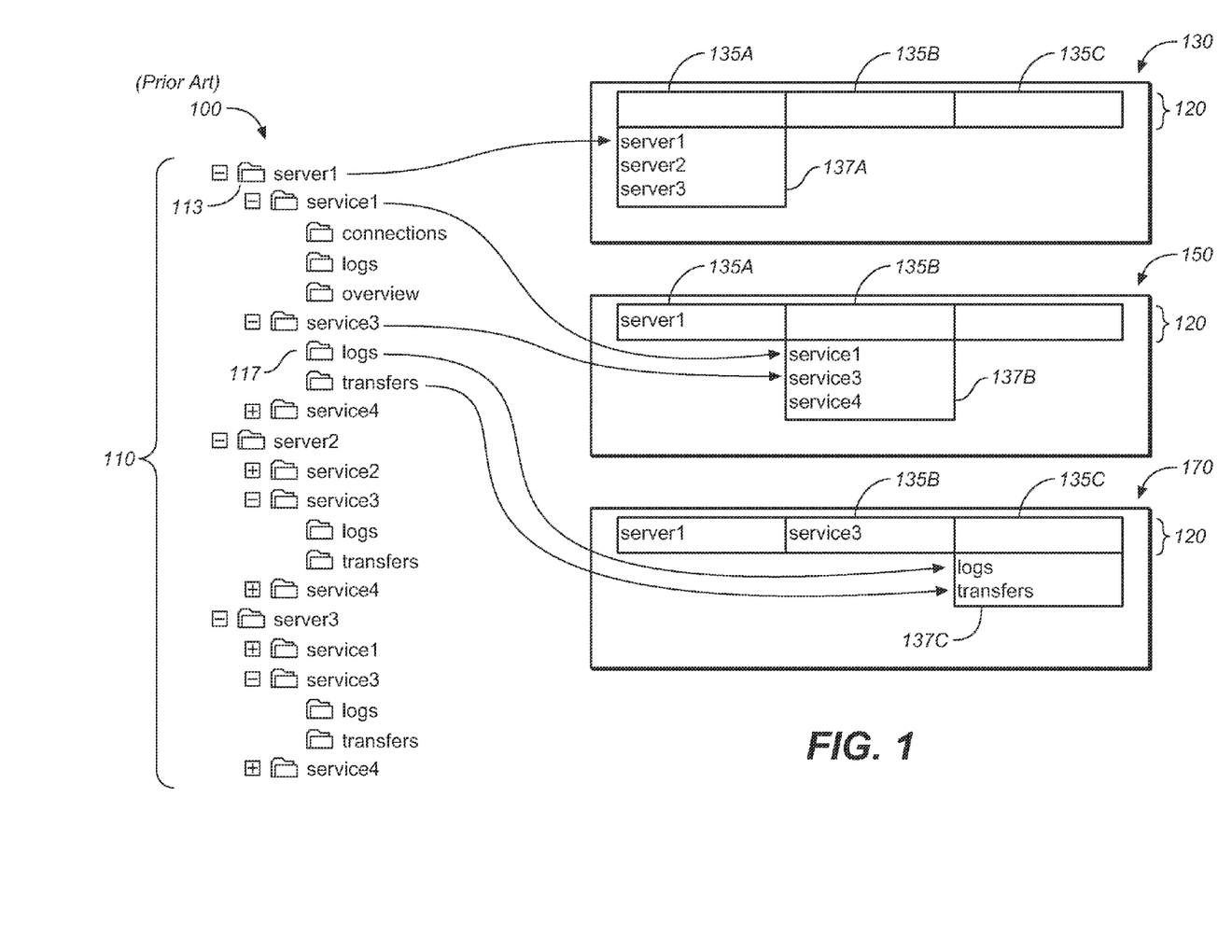
FIG. 1 is a series of screenshots of exemplary user interface elements for selecting items from a hierarchy of items.

FIG. 1 is a series of screenshots, each showing user interface elements for selecting items from a hierarchy of items. Throughout this specification a hierarchy of items that refers to administrating services running on servers is used repeatedly as illustrative subject matter. In practice, the hierarchy and the items contained in the hierarchy can refer to any subject matter.

The hierarchy of items includes several levels of items. A level in the hierarchy of items can contain items that are the parents of items in the next level of the hierarchy. For example, a hierarchy can present a variety of status information available for several services running on several servers. The highest level of items in the hierarchy can refer to several servers. The next level of items in the hierarchy can refer to services running on each server. The lowest level of items in the hierarchy can refer to categories of retrievable information related to each service (e.g., connections, logs, overviews, transfers, etc.). An example hierarchy is shown in screenshot 100.

The screenshot 100 includes a prior art user interface element 110 for selecting items from the hierarchy. The user interface element 110 is commonly referred to as a tree user interface element or a tree view. The items of the hierarchy are depicted as a tree, where each item 113 at the highest level in the hierarchy branches outward (e.g., to the right) and downward. The items shown below and to the right of a particular item 113 are items which are the children 117 of the particular item 113, where each child item 117 is in the next level of the hierarchy below the parent item. For example, the item server1 has three child items, service1, service3 and service4. Likewise, service3 has two child items at the next level of the hierarchy: logs and transfers. The user interface element 110 requires both vertical space to depict items in the hierarchy and horizontal space to distinguish (e.g., offset to the right) the level of items (e.g., to distinguish that high level items 113 are at a different level then the lowest level items 117).

An alternative to the prior art user interface element 110 is shown in screenshots 130, 150 and 170. The screenshots 130, 150 and 170 depict a collapsible, horizontally oriented user interface element 120 for selecting items from a hierarchy of items. The user interface element 120 has several cells 135, each corresponding to a level in the hierarchy of items. In the example shown, there are three cells 135A, 135B and 135C. The user interface element 120, shown in screenshot 130, is in an expanded state where a collection of items 137A is presented. The collection of items 137A are the items from the level of the hierarchy associated with the cell 135A. For example, if the cell 135A is associated with the highest level in the hierarchy, then the collection of items 137A are the items from the highest level in the hierarchy (e.g., server1, server2 and server3). If an item from the collection of items 137A is selected, the selected item can be shown in the cell 135A. Further details regarding selection of items are described in reference to FIG. 3.

As shown in screenshot 150, the user interface element 120 shows a selected item in the left-most cell 135A. The selected item is an item from the collection of items 137A associated with the cell 135A (e.g., the server1 item in the collection of items 137A). A second collection of items 137B corresponding to the cell 135B of the user interface element 120 is presented. Each item in the second collection of items 137B are items from the cell's corresponding level of the hierarchy (e.g., second level), each item is also the child item of the selected item in the previous level (e.g., shown in cell 135A). For example, if server1 is selected, then the child items of server1 are presented (e.g., service1, service3, service4) in the collection of items 137B that corresponds to the cell 135B.

Likewise, as shown in screenshot 170, a third collection of items 137C is presented depicting the collection of items from the last level of the hierarchy, the last level corresponding to the last cell 135C of the user interface element 120. The collection of items 137C are the children items of the selected item (e.g., service3) in the previous cell (e.g., cell 135B).

Each item in the hierarchy of items depicted by user interface element 110 can be represented in the user interface element 120, as indicated by the arrows in FIG. 1. Each level in the hierarchy is associated with a respective cell. The items of each level can be depicted in each collection of items associated with each cell. Items from a particular level of the hierarchy can be presented in user interface element 120 without presenting any other items from the previous level or the next level. Presenting only one level of items, and only those items that are the children of previously selected items minimizes the amount of horizontal and vertical space needed to present the items.

Accordingly, the conceptual hierarchy shown in the prior art user interface element 110 is preserved in the user interface element 120. However, the visual representation of the hierarchy is more compact in the user interface element 120.

Figure 2:
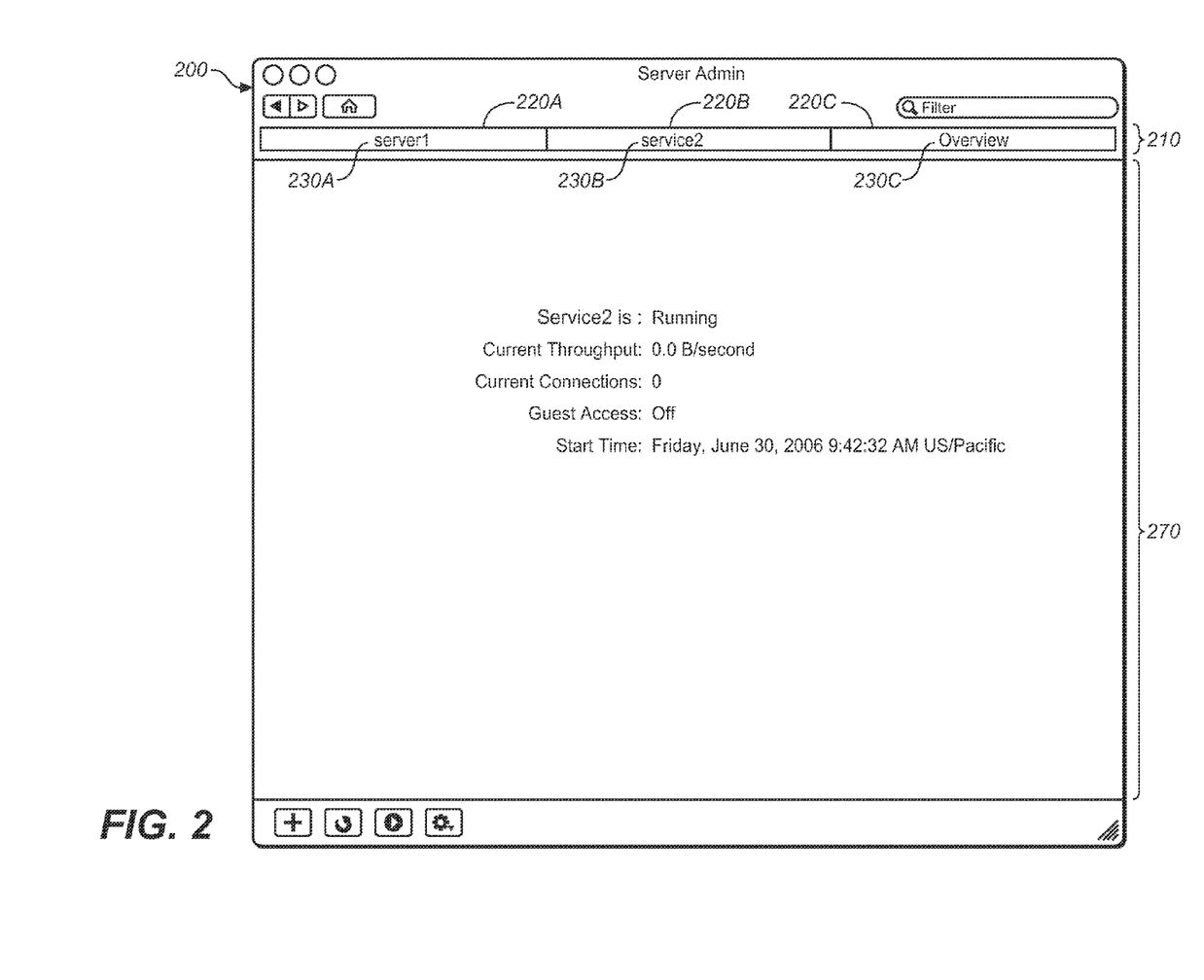
FIG. 2 is a screenshot of an exemplary user interface element displaying selected items from a hierarchy of items.

FIG. 2 is a screenshot 200 of an exemplary user interface element 210, in a collapsed state. The exemplary implementation also includes a display area 270 in which information can be depicted. The information presented in the display area 270 is responsive to the selection of items in the user interface element 210. The display area 270 is implementation specific and is not a component of the user interface element 210.

While the user interface element 210 is collapsed, the user interface element's visual representation depicts several cells 220A, 220B and 220C. Each of the cells 220A, 220B and 220C corresponds to a level in a hierarchy of items. A level in the hierarchy of items contains items that are the parents of items in the next (e.g., lower) level of the hierarchy. For example, the first level of the hierarchy can refer, by name, to servers on a network and the next level can refer, by name, to services running on each server. A server item can have several service items as children. In general, an item in one level of the hierarchy can appear as the child of more than one item at a higher level in the hierarchy. For example, 'service3' can be an item in the service level and can be a child item of both server1 and server2. In one implementation, the first, left-most cell corresponds to the highest level in the hierarchy.

In the example shown, each of the cells 220A, 220B and 220C has a label 230A, 230B and 230C, respectively. The labels 230 can include text (e.g., 'server1'), an image or icon. The labels 230 depict the currently selected item for each respective level of the hierarchy. For example, label 230A indicates that the server 'server1' is currently selected. In some implementations, each item has an iconic representation. For example, when the item is selected, an icon representing the item can be displayed in the cell 220 as the label 230.

In one implementation, if no item is selected at a particular level of the hierarchy, then label 230 of the corresponding cell 220 can be blank, indicating that no item is selected. Alternatively, the label 230 can indicate the name of the hierarchy (e.g., 'servers'). In another implementation the label 230 can provide information to the user (e.g., 'Please select a server').

In one implementation, an item at each level of the hierarchy can be selected automatically and represented in the label 230 of each respective cell 220. The selected item for each level or cell can be predetermined, based on user preferences, values provided by another process or the operating system.

The user interface element 210 can receive user input including keystrokes or shortcuts from a keyboard or keypad, clicks and cursor movements from a mouse, touch screen, or track pad, or identifications from a voice response or gesture recognition system. User input (e.g., clicking on the element) causes the user interface element 210 to be activated. Generally, activating the user interface element causes the element's visual representation to expand. While the user interface element is activated (e.g., in an activated state), the element's expanded visual representation is presented. Expansion of the representation allows multiple items from each level of items to be presented as a collection of items and allows users to provide further input to select or reselect items in each level of the hierarchy of items.

Figure 3:
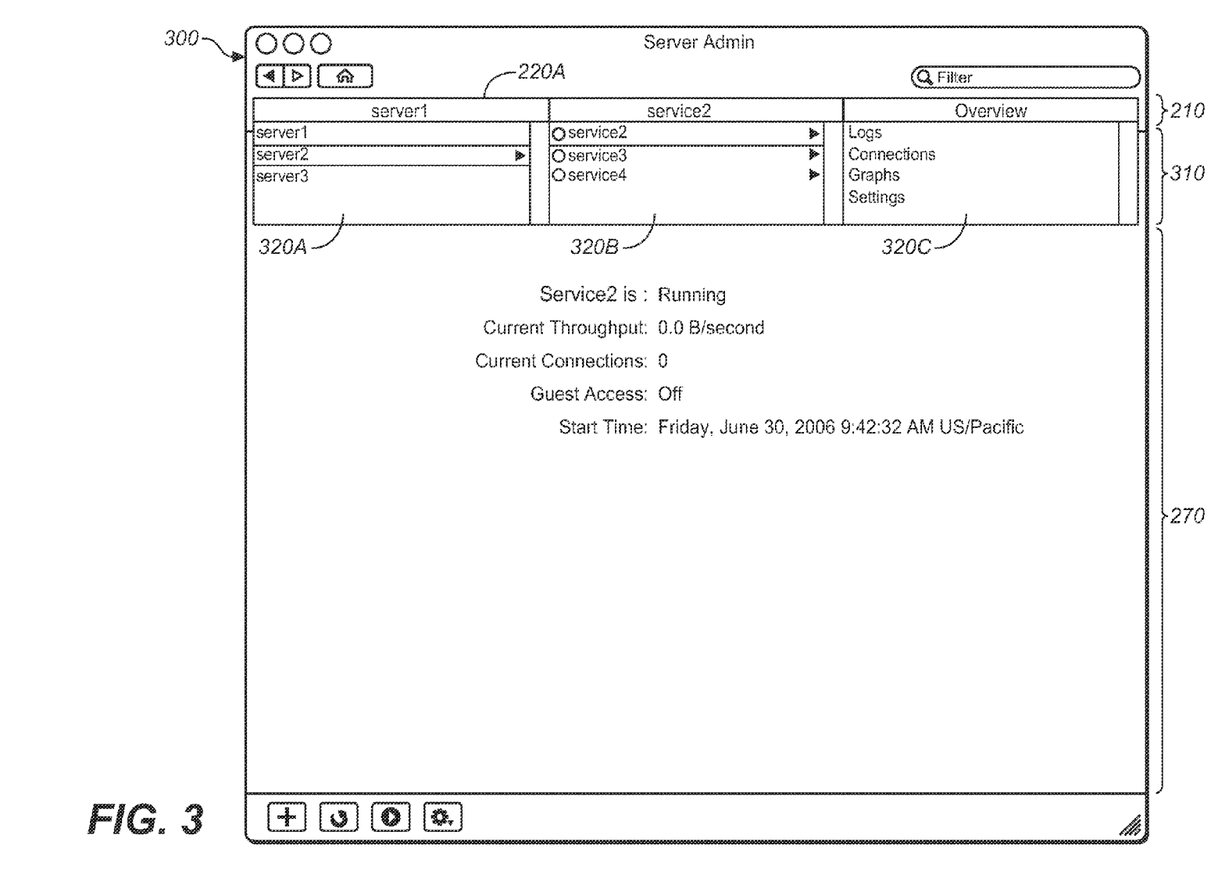
FIG. 3 is a screenshot of an exemplary user interface element for selecting items from a hierarchy of items.

In response to activating the user interface element 210, the expanded visual representation can appear to overlap and obscure at least part of the user interface surrounding element (e.g., the area occluded by the browser 310 in FIG. 3). In some implementations, the presentation of the expanded representation can be animated. For example, the expanded representation can be faded into view or can appear to roll or fall down below the user interface element 210.

FIG. 3 is a screenshot 300 of the exemplary user interface element 210 in an activated state, presenting an expanded visual representation. The expanded representation includes a browser user interface element 310. The browser user interface element 310 is sometimes referred to as a data browser or column view. The browser user interface element 310 can include several columns 320, each column capable of depicting a menu of items. Generally, the columns 320 correspond to the cells 220 presented in the user interface element's collapsed visual representation shown in FIG. 2. In one implementation, the columns are ordered from left to right, the left-most column corresponding to the highest level of items in the hierarchy of items. In each column 320, a collection of items including multiple items from the column's respective level can be displayed.

Except for the column corresponding to the highest level, the items that are displayed in a particular column depend on item(s) selected in the previous, higher-level column(s). The column that corresponds to the highest level of the hierarchy of items always contains the items from the highest level of the hierarchy. For example, the first column 320A, presents a list of server items because the server items are the highest level of items in the hierarchy. All other columns present items from their corresponding level in the hierarchy where each presented item is the child item of the selected item in the previous column. For example, selecting server 'server2' in column 320A causes column 320B to display items from the services level, such as 'service3' or 'service4' which both have 'server2' as a parent.

The selection of items at each level can also cause other implementation-dependent events to occur. For example, selection of a server in the first column 320A, corresponding to the first level of the hierarchy, causes general server information to be displayed in a display area 270. In addition the server's services (e.g., child items of the selected item) are presented in the next column 320B. Selecting a service item (e.g., 'service2') from the next column can cause the display area 270 to be updated to display information on the 'service2' service. Selection of the item also causes applicable items in the next column 320C to appear.

User input can be received to cause the user interface element 210 to collapse into the user interface element's collapsed state (e.g., as in FIG. 2). In some implementations, the user interface element 210 collapses when an item has been selected in the last column (e.g., an item is selected in each of the columns). In other implementations, the user interface element 210 collapses in response to input directed outside of the user interface element (e.g., clicking outside the expanded visual representation 310 of the element). In yet another implementation, the user interface element's expanded visual representation can also include a button or other user interface element that can receive input to cause the user interface element 210 to collapse.

In some implementations, if the selected item in a column is changed, selected items, if any, in lower-level columns will be unselected. For example, changing the server in column 320A to 'server3', causes the items in the subsequent columns (e.g., column 320B and column 320C) to be unselected. In other implementations, if the selected item in a column is changed to a new item, any selected items in lower-level columns will remain selected if the selected items are also a parent of the newly selected item. For example, changing the server in column 320A from 'server2' to 'server3', causes 'service2' in column 320B to remain selected if 'service2' is also a child of 'server3' (e.g., server3 is also running the 'service2' service).

Figure 4:
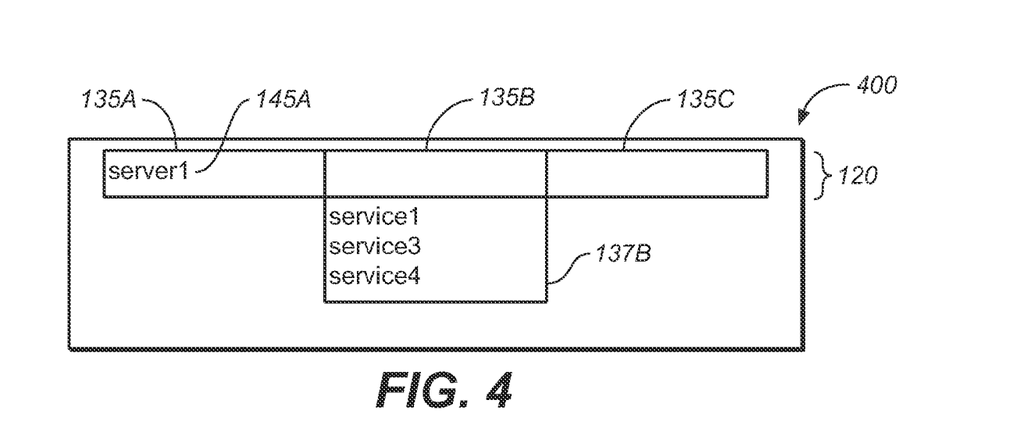
FIG. 4 is a screenshot of an exemplary user interface element that includes a drop down menu of items from a hierarchy of items.

FIG. 4 is a screenshot 400 of the exemplary user interface element 120 whose expanded representation includes a collection of items 137 for each level of in the hierarchy of items. The collection of items (e.g., server1, server2 and server3) appear in response to user input. Each item in the collection of items is selectable. The collection of items is hidden when subsequent user input has been received that selects an item from the collection of items (e.g., clicking on an item in the collection of items).

In one implementation, input directed at a particular cell causes a drop down menu to appear. The drop down menu can be presented in close proximity (e.g., under) the particular cell (e.g., as FIG. 3). When user input is received selecting an item from the items displayed in the drop down menu, that item is selected and cell's label (e.g., label 145A) can be updated. The drop down menu includes the collection of items corresponding to the level of hierarchy associated with the respective cell. The items included in the drop down menu are the children of the item selected in the previous, higher level cell. For example, selecting server 'server1' in first cell 135A causes drop down menu 137B to display items from the services level of the hierarchy, such as 'service1' or 'service3' which both have 'server1' as a parent.

In general, the expanded representation need not be depicted in close proximity to a cell in the user interface element. In some implementations, the collection of items (e.g., the drop down menu 137B), can be displayed in a completely separate area of the display or on a completely separate display. For example, the user interface element 120 and its cells 135 can be presented on a primary display screen while the menu of items 137 is depicted on a secondary display screen.

In some implementations, if user input is received directed to a particular cell, and no item has been selected for one or more of the previous cells, a drop down menu for the highest level cell for which no item is selected can be presented. For example, if an item is selected in the first cell 135A but no item is selected in the second cell 135B and input is directed to cell 135C, the drop down menu associated with cell 135B can appear.

Figure 5:
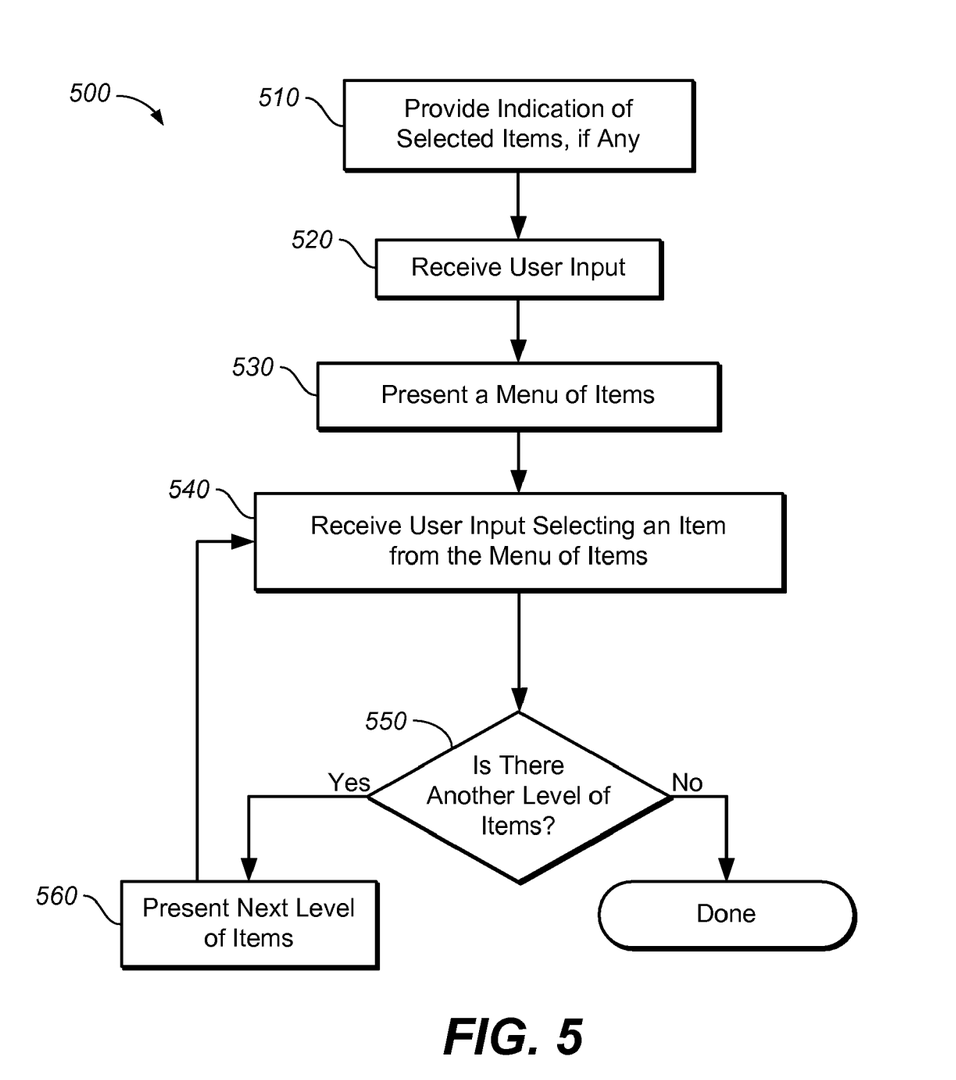
FIG. 5 is a flow diagram of a process for presenting a user interface element for selecting items from a hierarchy of items.

FIG. 5 is a flow diagram of a process 500 for presenting a user interface element for selecting items from a hierarchy of items. The process includes providing an indication of the current selection of items from each level of the hierarchy of items, if any (step 510). The indication can be provided while the user interface element is in a collapsed state, displaying only the selected items (e.g., the cell labels 145 seen in FIG. 4). The indication can be provided by labels that describe each item selected in each level in each respective cell or by other suitable indicia.

The process also includes receiving user input (step 520) directed toward one of the user interface element's cells. Receiving user input is responsive to expand the user interface element, presenting the expanded representation of the element (step 530). In some implementations, a drop down menu depicting a collection of items can be presented. In another implementation, a multi-column browser can be presented wherein each column depicts a collection of items.

User input is received that is directed to the expanded representation (step 540) to select an item from the presented collection of items. The selected item can be displayed in the corresponding cell of the user interface element (e.g., cell 156A in FIG. 4). In some implementations, user input can be received selecting multiple items at a particular level. For example, in one implementation a user can select multiple items in a collection of items by clicking on each item. In some implementations, in response to selecting an item from the collection of items, the collection of items can be hidden or removed.

The process 500 includes a step to determine whether the selected item is from the lowest level of the hierarchy (step 550). Each selected item, and the collection of items that the selected item was selected from is associated with a level of the hierarchy.

If the selected item is not from the lowest level of the hierarchy, then items from the next level in the hierarchy can be presented (step 560). In some implementations the next level of items can be presented as a new collection of items in the next column of a multi-column browser user interface element, or as a drop down menu. In other implementations, the previously presented collection of items can simply be replaced with the new collection of items.

Alternatively, if the selected item is from the lowest level of the hierarchy, then an item at each level has been selected. The selection of items from the hierarchy is complete. In response to subsequent input, directed at one of the cells of the user interface element, the cell's corresponding collection of items, can be presented in response (e.g., return to step 540).

Figure 6:
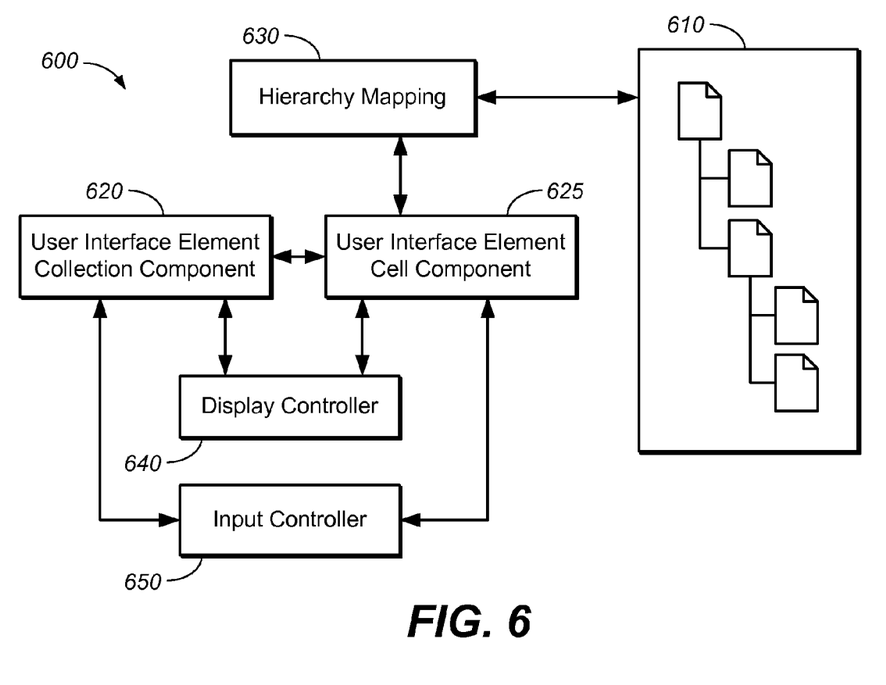
FIG. 6 is a block diagram of an exemplary system for selecting items from a hierarchy of items.

FIG. 6 is an exemplary system 600 for selecting items from a hierarchy of items using a collapsible user interface element. The system is generally equipped to present items from a hierarchy of items and receive input selecting items from each level in the hierarchy.

The system 600 includes a hierarchy of items 610 from which items can be selected. The hierarchy can be pre-defined or can be received from outside the system. For example, the hierarchy of items can be received from the operating system (e.g., a hierarchy representing files on a disk). Alternatively, the hierarchy can be loaded from a file, containing a hierarchy of items (e.g., the items may be elements from a document of nested XML elements). In another implementation, the levels can be predefined, while the items in each level are populated dynamically (e.g., by an operating system, from another process, etc.). For example, the server level of the hierarchy can be populated by querying the network to discover active servers, each server in turn can be interrogated to populate a list of services running on each server.

The hierarchy of items 610 can be accessed by a hierarchy mapping module 630. The hierarchy mapping module maps levels of hierarchy of items to cells of the user interface element. Each level of the hierarchy and the items of each level, and whether or not any of the items are selected, can be managed by the user interface element cell component 625. The user interface collection component 620 can determine what items of the hierarchy can be presented as a collection of items given the collection's associated cell and the cell's associated level of the hierarchy. The user interface collection component 620 can receive hierarchy information from the user interface cell component 625. In other implementations, both the user interface collection component 620 or cell component 625 can access the hierarchy mapping 630 directly.

To present selected items or a collection of items, the user interface cell component 625 and collection component 620, respectively, can use a display controller 640. The display controller can receive information for displaying, to the user, the user interface element (e.g., cells, cell labels and collections of items).

The system 600 can receive input from an input controller 650. The input controller can provide information to the user interface element cell component 625 about which cell input has been directed to. The input control 650 can also provide information to the user interface collection component 625 about which item among the items in a collection, a user has directed user input to.

In other implementations, the system can combine components described above or use one or more additional components. Each component can be implemented in a combination of hardware and software.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    generating a user interface element for presentation on a display device, the user interface element having a plurality of expandable cells operable for displaying items that are organized in a hierarchy, where items associated with a common level of the hierarchy are exclusively associated with one of the plurality of cells designated for the common level;
    receiving first input directed to the user interface element;
    responsive to receiving the first input, expanding a first cell of the user interface element designated for a first level of the hierarchy and displaying in the expanded first cell a first collection of items associated with the first level of the hierarchy;
    receiving second input selecting a first item in the displayed first collection of items; and
    in response to the selection of the first item, collapsing the first cell to hide the displayed first collection of items and expanding a second cell of the user interface element designated for a second level of the hierarchy immediately below the first level to display a second collection of items associated with the second level.

2. The method of claim 1, where each of the plurality of cells displays a selected item, the selected item being one of the items in the hierarchy.

3. The method of claim 1, further comprising:
in response to the first input directed to the user interface element, presenting a display area on the display device to display information related to the selected first item.

4. The method of claim 1, further comprising:
in response to the selection of the first item and prior to expanding the second cell, determining whether the selected first item is from a lowest level of the hierarchy; and
expanding the second cell of the user interface element and displaying the second collection of items only upon determination that the selected first item is not from a lowest level of the hierarchy.

5. The method of claim 4, further comprising:
receiving third input selecting a second item in the displayed second collection of items;
in response to the selection of the second item, determining whether the selected second item is from a lowest level of the hierarchy; and
upon determination that the selected second item is from a lowest level of the hierarchy, collapsing the second cell to hide the displayed second collection of items.

6. The method of claim 5, where the items in the second collection of items are children of the selected first item.

7. The method of claim 1, wherein upon completion of item selection for each cell of the user interface element, the second cell of the user interface element is independently expandable to display items associated with the second level of the hierarchy while the first cell designated for the first level remains in a clasped state.

8. The method of claim 1, further comprising:
providing an indication of the selected first item within the first cell designated for the first level of the hierarchy.

9. The method of claim 1, further comprising:
identifying items from the second level of the hierarchy for inclusion in the second collection of items based on the selected first item; and
displaying the second collection of items in the expanded second cell.

10. The method of claim 9, wherein:
each identified item is a child of the selected first item in the hierarchy.

11. The method of claim 1, where at least one cell is a combo box.

12. The method of claim 1, where the expanded first cell displays more than one item.

13. The method of claim 1, where the expanded first cell is a browser user interface element.

14. The method of claim 1, further comprising:
in response to user input directed to one of the plurality of cells designated for a level of the hierarchy while no item has been selected for one or more higher levels of the hierarchy, presenting an expanded view of a cell exclusively associated with the highest level of the hierarchy for which no item has been selected.

15. The method of claim 14, further comprising:
displaying a third collection of items in the expanded view of the cell, the third collection of items being associated with the highest level of the hierarchy for which no items has been selected in the expanded view; and
receiving user input selecting a second item from the third collection of items.

16. The method of claim 15, further comprising:
presenting a collapsed visual representation of the user interface element after receiving user input selecting an item without any children.

17. A computer-readable medium having stored thereon instructions, which, when executed by a processor, causes the processor to perform operations comprising:
generating a user interface element for presentation on a display device, the user interface element having a plurality of expandable cells operable for displaying items that are organized in a hierarchy, where items associated with a common level of the hierarchy are exclusively associated with one of the plurality of cells designated for the common level;
receiving first input directed to the user interface element;
responsive to receiving the first input, expanding a first cell of the user interface element designated for a first level of the hierarchy and displaying in the expanded first cell a first collection of items associated with the first level of the hierarchy;
receiving second input selecting a first item in the displayed first collection of items; and
in response to the selection of the first item, collapsing the first cell to hide the displayed first collection of items and expanding a second cell of the user interface element designated for a second level of the hierarchy immediately below the first level to display a second collection of items associated with the second level.

18. The computer-readable medium of claim 17, where each of the plurality of cells displays a selected item, the selected item being one of the items in the hierarchy.

19. The computer-readable medium of claim 17, wherein the operations further comprise:
in response to the first input directed to the user interface element, presenting a display area on the display device to display information related to the selected first item.

20. The computer-readable medium of claim 17, wherein the operations further comprise:
in response to the selection of the first item and prior to expanding the second cell, determining whether the selected first item is from a lowest level of the hierarchy; and
expanding the second cell of the user interface element and displaying the second collection of items only upon determination that the selected first item is not from a lowest level of the hierarchy.

21. The computer-readable medium of claim 20, wherein the operations further comprise:
receiving third input selecting a second item in the displayed second collection of items;
in response to the selection of the second item, determining whether the selected second item is from a lowest level of the hierarchy; and
upon determination that the selected second item is from a lowest level of the hierarchy, collapsing the second cell to hide the displayed second collection of items.

22. The computer-readable medium of claim 21, where the items in the second collection of items are children of the selected first item.

23. The computer-readable medium of claim 17, wherein upon completion of item selection for each cell of the user interface element, the second cell of the user interface element is independently expandable to display items associated with the second level of the hierarchy while the first cell designated for the first level remains in a clasped state.

24. The computer-readable medium of claim 17, wherein the operations further comprise:
providing an indication of the selected first item within the first cell designated for the first level of the hierarchy.

25. The computer-readable medium of claim 17, wherein the operations further comprise:

identifying items from the second level of the hierarchy for inclusion in the second collection of items based on the selected first item; and displaying the second collection of items in the expanded second cell.

26. The computer-readable medium of claim 25, wherein: each identified item is a child of the selected first item in the hierarchy.

27. The computer-readable medium of claim 17, where at least one cell is a combo box.

28. The computer-readable medium of claim 17, where the expanded first cell displays more than one item.

29. The computer-readable medium of claim 17, where the expanded first cell is a browser user interface element.

30. The computer-readable medium of claim 17, wherein the operations further comprise:

in response to user input directed to one of the plurality of cells designated for a level of the hierarchy while no item has been selected for one or more higher levels of the hierarchy, presenting an expanded view of a cell exclusively associated with the highest level of the hierarchy for which no item has been selected.

31. The computer-readable medium of claim 30, wherein the operations further comprise:

displaying a third collection of items in the expanded view of the cell, the third collection of items being associated with the highest level of the hierarchy for which no items has been selected in the expanded view; and receiving user input selecting a second item from the third collection of items.

32. The computer-readable medium of claim 31, wherein the operations further comprise:

presenting a collapsed visual representation of the user interface element after receiving user input selecting an item without any children.

33. A system comprising:

one or more processors;

memory coupled to the one or more processors and operable for storing instructions, which, when executed by the one or more processors, cause the one or more processors to perform operations, comprising:

generating a user interface element for presentation on a display device, the user interface element having a plurality of expandable cells operable for displaying items that are organized in a hierarchy, where items associated with a common level of the hierarchy are exclusively associated with one of the plurality of cells designated for the common level;

receiving first input directed to the user interface element;

responsive to receiving the first input, expanding a first cell of the user interface element designated for a first level of the hierarchy and displaying in the expanded first cell a first collection of items associated with the first level of the hierarchy;

receiving second input selecting a first item in the displayed first collection of items; and in response to the selection of the first item, collapsing the first cell to hide the displayed first collection of items and expanding a second cell of the user interface element designated for a second level of the hierarchy immediately below the first level to display a second collection of items associated with the second level.

34. The system of claim 33, where each of the plurality of cells displays a selected item, the selected item being one of the items in the hierarchy.

35. The system of claim 33, wherein the operations further comprise:

in response to the first input directed to the user interface element, presenting a display area on the display device to display information related to the selected first item.

36. The system of claim 33, wherein the operations further comprise:

in response to the selection of the first item and prior to expanding the second cell, determining whether the selected first item is from a lowest level of the hierarchy; and expanding the second cell of the user interface element and displaying the second collection of items only upon determination that the selected first item is not from a lowest level of the hierarchy.

37. The system of claim 36, wherein the operations further comprise:

receiving third input selecting a second item in the displayed second collection of items;

in response to the selection of the second item, determining whether the selected second item is from a lowest level of the hierarchy; and upon determination that the selected second item is from a lowest level of the hierarchy, collapsing the second cell to hide the displayed second collection of items.

38. The system of claim 37, where the items in the second collection of items are children of the selected first item.

39. The system of claim 33, wherein upon completion of item selection for each cell of the user interface element, the second cell of the user interface element is independently expandable to display items associated with the second level of the hierarchy while the first cell designated for the first level remains in a clasped state.

40. The system of claim 33, wherein the operations further comprise:

providing an indication of the selected first item within the first cell designated for the first level of the hierarchy.

41. The system of claim 33, wherein the operations further comprise:

identifying items from the second level of the hierarchy for inclusion in the second collection of items based on the selected first item; and displaying the second collection of items in the expanded second cell.

42. The system of claim 41, wherein:

each identified item is a child of the selected first item in the hierarchy.

43. The system of claim 33, where at least one cell is a combo box.

44. The system of claim 33, where the expanded first cell displays more than one item.

45. The system of claim 33, where the expanded first cell is a browser user interface element.

46. The system of claim 33, wherein the operations further comprise:

in response to user input directed to one of the plurality of cells designated for a level of the hierarchy while no item has been selected for one or more higher levels of the hierarchy, presenting an expanded view of a cell exclusively associated with the highest level of the hierarchy for which no item has been selected.

47. The system of claim 46, wherein the operations further comprise:
- displaying a third collection of items in the expanded view of the cell, the third collection of items being associated with the highest level of the hierarchy for which no items has been selected in the expanded view; and
- receiving user input selecting a second item from the third collection of items.

48. The system of claim 47, wherein the operations further comprise:
- presenting a collapsed visual representation of the user interface element after receiving user input selecting an item without any children.

* * * * *

UNITED STATES PATENT AND TRADEMARK OFFICE
CERTIFICATE OF CORRECTION

| | | |
|---|---|---|
| PATENT NO. | : 7,788,599 B2 | Page 1 of 1 |
| APPLICATION NO. | : 11/494879 | |
| DATED | : August 31, 2010 | |
| INVENTOR(S) | : Jeffrey H. Michaud et al. | |

It is certified that error appears in the above-identified patent and that said Letters Patent is hereby corrected as shown below:

Title page, Item (54), in "Title", in column 1, line 1, delete "ELEMENTS" and insert -- ELEMENT --, therefor.

In column 1, line 1, delete "ELEMENTS" and insert -- ELEMENT --, therefor.

In column 12, line 2, in claim 17, delete "causes" and insert -- cause --, therefor.

Signed and Sealed this
Twenty-ninth Day of November, 2011

David J. Kappos
*Director of the United States Patent and Trademark Office*